April 30, 1940.　　F. L. WETTENGEL　　2,198,644
COIL HANDLING DEVICE
Filed Nov. 4, 1937　　5 Sheets-Sheet 1

Frank L. Wettengel
INVENTOR

BY Kimmel & Crowell
ATTORNEYS.

April 30, 1940.　　　F. L. WETTENGEL　　　2,198,644
COIL HANDLING DEVICE
Filed Nov. 4, 1937　　　5 Sheets-Sheet 2

Frank L. Wettengel,
INVENTOR
BY Kimmel & Crowell
ATTORNEYS

April 30, 1940.  F. L. WETTENGEL  2,198,644
COIL HANDLING DEVICE
Filed Nov. 4, 1937   5 Sheets-Sheet 3

Frank L. Wettengel,
Inventor

By Kimmel & Crowell
Attorneys

April 30, 1940.  F. L. WETTENGEL  2,198,644
COIL HANDLING DEVICE
Filed Nov. 4, 1937    5 Sheets-Sheet 5

Frank L. Wettengel,
Inventor

By Kimmel & Crowell,
Attorneys.

Patented Apr. 30, 1940

2,198,644

UNITED STATES PATENT OFFICE 2,198,644

COIL HANDLING DEVICE

Frank L. Wettengel, Pittsburgh, Pa.

Application November 4, 1937, Serial No. 172,814

29 Claims. (Cl. 242—81)

This invention relates to improved means for removing magnetic strip-metal coils from collapsible coiler drums upon which the strip-metal coils have been formed.

In the manufacturing of light plates, sheet steel, and tin-plate base steel, a heavy, highly heated steel slab is rolled into steel ribbons. These hot steel ribbons, as they come from the hot rolling mills, are comparatively thin approximately $\frac{1}{16}$ inch thick, and vary in width up to 90 inches or over. They are hundreds of feet long. They are commercially known as strip. This strip in its extended form occupies a great amount of space and is unwieldy. It must be shaped into the simplest, most compact and convenient form possible, for handling and manipulation in the various processes which follow the hot rolling. This convenient form is generally a hollow cylinder, the forming of which is the last operation in the hot rolling process. The hot hollow cylinders vary in length and diameter with the particular strip dimensions and in this form a strip is usually called a coil.

After the hot coil has cooled the strip is passed through various processing operations such as pickling, cold rolling, normalizing, tempering, shearing, etc. These treatments require the strip in the coils to be uncoiled, processed, and recoiled. This recoiling, which in some cases is under light tension and in other cases under heavy tension, is done on a strip coiler, (also sometimes called strip reels, tension reels, blockers, etc.). Various forms thereof consist essentially of an overhung, cylindrical, collapsible drum, hereinafter called a coiler drum, having a suitable diameter and length to accommodate the maximum width of strip.

A strip coiler generally comprises a collapsible coiler drum rotatably mounted on a rotatable shaft, carried in bearings mounted in a drive frame, and driven by suitable gearing. The shaft with drum is generally supported in the manner of a cantilever, by the bearings. The process of forming a coil on a coiler drum is as follows.

With the empty coiler drum at rest and collapsed, the entering end of the strip is passed into a gripper slot in the drum which contains a gripping device. A flap bridges the slot and is held open by springs. A brake wheel is integral with the coiler drum and may be firmly held by brake bands while the shaft is rotated by the gearing. This effects a gripping of the entering end of the strip and the expansion of the coiler drum, at the same time, due to cam action of the shaft inside the coiler drum. The brake bands are then released and the coiling proceeds with the first layer of the strip which is now under tension closing the flap. When the coil has been completed it is then necessary to bind or tie it to keep it from spring open spirally. The coil must thereafter be removed from the coiler drum so that another strip can be coiled.

The larger coils which weigh thousands of pounds are too heavy to be removed by hand and must be removed by a mechanical device called a coil stripper. The brake wheel is gripped by the brake bands and the shaft is rotated in the opposite direction, from the rotation employed when expanding as first mentioned, thereby collapsing the coiler drum and releasing the grip on the entering end of the strip in the slot. While there are numerous types of coiler drums in use having different kinds of grippers without flaps, and various methods of collapsing the drum, the type having the flap is described as it is most common and embodies most of the features common to the other types of coiler drums. After the coiler drum is collapsed the coil is ready to be stripped.

The various coil strippers now in use consist essentially of a car with wheels running on guiding tracks, the car being traversed by an air cylinder or other means. Superimposed on this car and integral therewith is a bifurcated yoke which closely fits the lower semi-circumference of the coiler drum. On this car is also mounted a cradle to lift the coil free of the collapsed coiler drum and secondly to support the coil while stripping.

Due to the variations in the coil diameters this cradle must be adjustable in vertical height and powerful enough to lift the coil. This adjustment may be accomplished in various ways, such as by hydraulic or air cylinders, screws operated by worm or other gearing, levers, parallel motion, or a combination of these devices; all power operated. When stripping a coil by the strippers now in use, the coiler drum must be positioned with the flap in the upper semi-circumference because, if it is positioned in the lower semi-circumference, the close fitting bifurcated yoke will prevent the flap from opening and will thereby clamp the entering end of the strip and hinder the stripping. It will also prevent the return of the stripper to its original position because the bifurcated yoke will strike the flap which is held wide open by its springs.

The operation of the usual coil stripper is as follows: the coiler drum with the coil coiled thereon having come to rest, the tying band is passed around the coil and fastened. The drum is then collapsed with the flap in the top semi-circumference. The car with all integral parts is then moved until the bifurcated yoke contacts the drive end of the coil. The cradle is then elevated lifting and balancing the coil and removing the weight from the drum and allowing the flap to partially open. It also clears the internal surface of the coil, from the external surface of the collapsed coiler drum, thereby eliminating as much surface friction as possible between the coil and the collapsed coiler drum as well as the friction of the entering end of the strip against the slot.

The car with all its superimposed attachments is then moved away from the coiler drum. This movement causes the bifurcated yoke to push the coil off of the coiler drum. This description has set forth the ideal operation but seldom in practice is this ideal realized due to various causes. The human element in elevating the cradle too high or not high enough causes undue friction, and various foreign obstructions such as steel slivers, etc., may get in the slot. Deformations of the strip may result from the gripper jaws, surface irregularities in the coil, or coiler drum, or in the slot. It is not infrequent that the entering end of the strip is crumpled or buckled into wrinkles inside of the slot, thereby jamming and causing the inner layers of the coil to become extended telescopically. Such conditions reduce the internal circumference of the coil and thereby clamp the collapsed coiler drum making it very difficult to remove the coil. This compels the suspension of operations on all of the preceding processing equipment. No mechanical device has heretofore been devised that will always satisfactorily remove the coil from the coiler drum and also always meet other essential requirements.

Another unsurmountable objection to this type of equipment, especially when working with small light coils, is due to the human element failing to arrest the powerful elevating force of the cradle at the proper instant with a resultant concentration of this lifting force on the shaft, the coil, and coiler drums, with a consequent bending of the shaft and serious damage to the strip coiler.

After the coil is stripped and it is clear of the overhung end of the drum by several inches it is lifted off the stripper cradle by a crane. Some cradles are supported so the cradle with or without the coil will rotate around its fulcrum which is located eccentrically with relation to the vertical center line of the drum and cradle which are identical. This type of cradle is held in a horizontal position by a stop and is tilted when the coil is clear of the coiler drum, by various mechanical devices usually by a roller which is an integral part of the cradle, engaging a wedge cam due to the continued movement of the car. The cradle thus tilted slightly past the horizontal position is held by a stop and rolls the coil off onto the floor, a conveyor, or other means to transport it for other processing. All of these operations must be completed and the stripper with its integral bifurcated yoke returned into its original position adjacent the brake before operations can be resumed. While the foregoing describes in general the art and difficulties of coiling and stripping coils it will be obvious to those skilled in the art that there are numerous detail deviations from the above.

One object of this invention is to provide a new method of and means for removing or stripping coils from a strip coiler. Another object is to provide means that is capable of exerting very great as well as controllable holding forces. Still another object is to provide such a device which utilizes the magnetic forces of one or more electromagnets. A further object is to provide a stripper which is relatively movable with respect to the coiler. Another object is to arrange the stripper so that the coiler drum may project through it. A still further object is to arrange the coil stripper so that it may be energized in part or in whole. Yet another object is to arrange the stripper so that it will not damage the coils while handling them.

A further object is to provide a stripper which uses forces of tension instead of compression. Another object is to pull off the coil. A further object is to provide accurate control means. Another object is to provide an electrical control system. Other objects of the invention include the elimination of cylinders, motors, cams, shafts, gears, etc., previously deemed essential stripping elements. A further object is to provide means to hold the parts fixed in position.

A further object is to provide a coil stripper with a tying electromagnet. Another object is to provide a coil stripper with a magnetic unloading cradle. A further object is to provide a vertical coil stripper. Another object is to provide a magnetic unloading roller conveyor cradle.

Another object is to avoid the difficulties existent in present apparatus. Another object is to provide a magnetic coil stripper. With the object in view of eliminating the stripping difficulties outlined and attaining the other objects hereinbefore mentioned, a magnetic coil stripper is devised in accordance with this invention which is simple in design, sturdy in construction, economical to manufacture, install and maintain, and operate, and which will pull the coil off of the coiler drum. Other valuable advantages and novel features will be apparent from the following detail description taken in conjunction with the accompanying drawings.

In the drawings, wherein like numerals represent corresponding parts in the various figures.

Figs. 3—4—5—6—7 and 8 show the sequence of operation.

Figure 1:
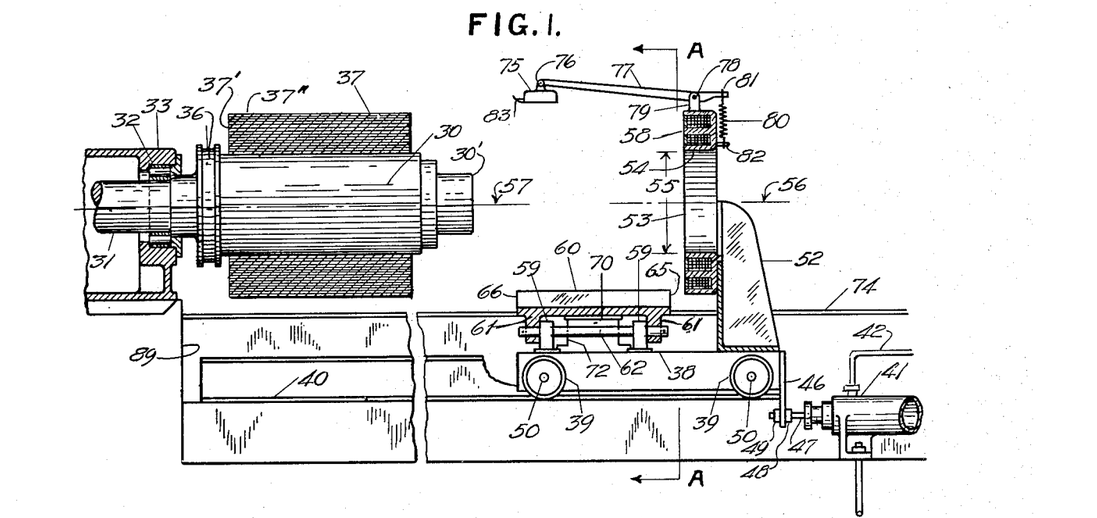
Fig. 1 is a sectional side elevation of a coiler drum with a magnetic coil stripper constructed in accordance with the features of the present invention.

In the embodiment of the invention herein illustrated, there is provided a strip coiler comprising a collapsible strip coiler drum 30 rotatably mounted on a rotatable shaft 31, which is carried by bearings 32 mounted in a drive frame 33, and driven by suitable gearing which is not shown. The shaft 31 is supported by the bearings so as to provide a cantilever suspension. The coiler drum is provided with a gripper slot 34 (see Fig. 2) which contains a gripping device. A flap 35 bridges the slot and is held open by springs. The strip coiler drum is provided with a brake wheel 36 which is integral with it and which may be firmly held by brake bands.

When the brake bands are firmly gripping the brake wheel, the drum will be held stationary while the shaft 31 is free to rotate. The rotation of the shaft effects a gripping of the entering end of a strip and an expanding of the coiler drum 30 at the same time, the latter action in response to cam action of the shaft 31 inside of the coiler drum. After the coiler drum has been expanded and the strip has been firmly gripped the brake bands are then released and the coiling operation proceeds. The first layer or convolution of the strip closes the flap 35 as in Fig. 2. When the coiling operation is completed on the strip coiler drum, the coil 37 remains formed on the coiler drum. After this the coil must be removed. The brake wheel is again gripped by the brake bands and the shaft 31 is again rotated but in the opposite direction, to thereby collapse the coiler drum and release the gripping means at the entering end of the strip.

Figure 2:
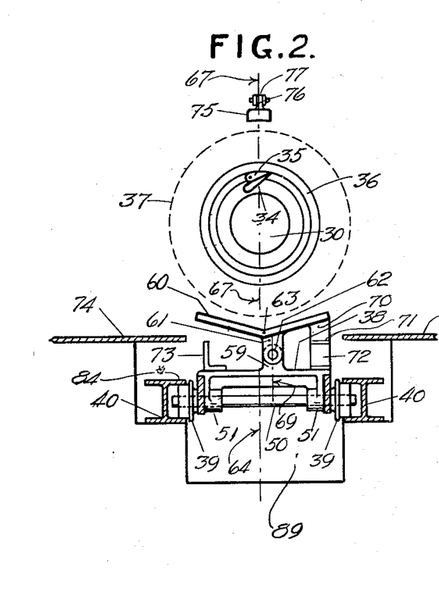
Fig. 2 is an end view partly in section taken on the line A—A of Fig. 1.

The magnetic coil stripper includes a car 38 which is provided with wheels 39 (or slides in lieu of wheels) which are arranged to run on the guide tracks 40. The car is arranged to be moved by a fluid cylinder 41 operated by air, liquid or other medium, or by other means. As shown it comprises the fluid power means having the cylinder 41 with control pipes 42 and 43 controlled by a four-way valve 44. The piston being actuated by the power fluid, is connected to the car 38 by the coupling plate 46 and piston rod 47. The piston rod is fastened to the plate by the threaded nuts 48 and 49. The car frame 38 is mounted on axles 50 which rotate in bearing 51. Superimposed on the car frame is a rigid magnet support 52 carrying a coil stripping electromagnet 53. The coil stripping electromagnet 53 is hollow or annular having a central opening 54 and may be cylindrical or of other suitable shape. Furthermore the magnet may be a single large magnet or preferably a group of individual magnets combinedly forming the larger magnet having an internal diameter 55 slightly larger than the outside diameter of the expanded coiler drum 30. The outside diameter of the magnet is about the same or is slightly larger than that of coil 37. The coil stripping electromagnet 53 is positioned so its axis 56 is concentric with the axis 57 of the coiler drum 30. The top portion 58 of the coil stripping electromagnet 53 is preferably constructed in sections so that one or more sections in the top can be energized independently of the other sections. The combined magnetic strength, of all of the sections of this coil stripping magnet when energized, is sufficient to support the longest and heaviest coil 37, which may be made on the coiler, with the axis of the coil held in a horizontal position and with the face of the magnet contacting the end face of the coil. The combined magnetic pull is great enough to create between the magnet face and the coil end a coefficient of friction great enough to hold the coil rigidly in horizontal position.

The one or more sections in the top portion 58 of the coil stripping magnet 53 when energized to various degrees, without the balance of the sections, has sufficient magnetic pull to support various size coils with their axis in a horizontal position. The co-efficient of friction between the coil end and face of the magnet when only these top sections are energized is not however, great enough to entirely overcome the force of gravity and the coil will gradually slide down the face of the magnet with its axis in a horizontal position and its end in contact with the face of the coil stripping electromagnet.

Also mounted on this car frame 38 in bearings 59 integral with the car frame is a magnetic unloading cradle 60 eccentrically mounted by its integral lugs 61 and pivot shaft 62 oscillating in the bearings. The pivot shaft 62 and the trough 63 of the cradle 60 are located parallel with and equidistant from the horizontal longitudinal axis 57 of the coiler drum 30 and the coaxial axis 56 of coil stripping electromagnet 53, as well as parallel with the longitudinal center line 64 of the car frame 38. The cradle is also located far enough away radially from the coiler drum axis so that it will clear the outside of the maximum diameter coil. The length of the cradle to its end 65 from end 66 measured away from the coil stripping electromagnet face is approximately as long as the longest coil. The cradle is pivoted eccentrically with relation to the vertical center line 67 of the coiler drum 30 and the apex 63 of the magnetic unloading cradle trough, due to the pivot shaft 62 being positioned with its vertical center line 69 to one side of the vertical center line 67, as shown in Fig. 2. The magnetic unloading cradle on this eccentric side has as an integral part, magnet armature 70 which makes this side of heavier construction so that the center of gravity is farther to the right from the apex 63 than the center of the pivot shaft 62, thus causing the cradle to rotate clockwise until it abuts the upper face 71 of the cradle electromagnet 72 which is located on and secured to the car frame 38.

This cradle electromagnet 72 serves two purposes: First, it acts as a limit stop for determining the clock-wise movement of the cradle so as to position the apex of the cradle trough and its angular surfaces in the same relative plane with respect to the vertical center line of the coiler drums 30; and secondly, it is powerful enough when energized to hold the cradle and the heaviest coil resting on it, in this position. When the weight of the coil is placed on the cradle, the center of gravity shifts to the left of the pivot shaft 62, and when the cradle unloading electromagnet 72 is then de-energized, the cradle will tilt counter-clockwise due to the weight of the coil, until the cradle contacts the stop 73. This automatic tilting rolls the coil off of the cradle onto the floor 74 to the left in Fig. 2, or on to other means for transporting the coil.

With a short coil, the magnetic lines of force from the electromagnet 53 when contacting the end of the coil 37, will prevent the coil from springing open spirally, but on long coils the magnetic lines of force generally will not penetrate entirely to the opposite end. To compensate for this effect and to prevent the opposite end of a long coil from springing open spirally, a binding or tying electromagnet 75 is provided. When the coil stripping electromagnet 53 contacts the end of a coil 37 the tying electromagnet 75 will be over the coil, near the opposite end, longitudinal with, and far enough away radially from the coiler drum 30 to clear a coil 37 of maximum diameter.

This tying electromagnet 75 is pivotally (or universally) suspended at 76 on the end of a supporting arm 77 which latter is pivoted at 78 in a bracket 79 secured upon the coil stripping electromagnet or upon any other convenient and suitable place. An adjustable spring 80 is adjusted so the arm 77 with the tying electromagnet suspended therefrom is slightly over-counterbalanced and is retained in a floating position. The spring is secured to the arm at 81 and to the stripping magnet at 82. A guide 83 is placed at the forward end of the tying electromagnet to help guide it and prevent any damage should the over-counterbalance fail to hold this magnet in its extreme radial position. In lieu of the spring counterbalance this tying electromagnet may be suspended on ropes or chains, passing over suitable sheaves or sprocket wheeels, and counterbalanced by weights or other means. If desired the means for carrying the tying electromagnet can be attached to a fixed support considerably above the coil with the tying electromagnet hanging down as a pendant free to swing to the extreme positions which the coil will occupy.

All of the heretofore described appurtenances are mounted on the car frame 38 and for all practical purposes they operate as a unit or as integral parts with each other. As such they are traversed on the car wheels 39, (or slides in lieu of wheels), and guided by suitable tracks 40 located parallel with and equidistant from the axis of the coiler drum. They are in such a position that the internal diameter of the coil stripping electromagnet clears the expanded diameter of the coiler drum from end to end. Furthermore, the upper flange 84 of the track cooperates to prevent any unbalancing of the car. The pneumatic or hydraulic cylinder 41, (screw, motor, or other means) provides the means for traversing the magnetic coil stripper as previously described to contact the coil end and to withdraw the same to strip the coil. The stripper mechanism location is necessarily determined by the coiler drum and maximum coil diameter which usually causes all of the under structure to be placed in a pit 89 out of the way.

Figure 3:
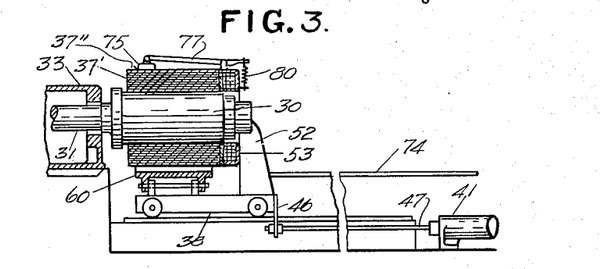
Fig. 3 is a longitudinal vertical elevation partly in section showing the energized coil stripper just before removing a coil.

Having briefly described the magnetic coil stripper, its sequence of operation is as follows: Figs. 1 and 2 show the stripper and cradle in idle position, none of the magnets being energized and therefore not consuming power. The stripper is in the extreme position away from the coiler drum. The coil 37 has just been completely coiled on the drum and is ready to be stripped. If desirable the stripper can be advanced close to the overhung end of the coiler drum while the coiling is in progress. In Fig. 3 the coiler drum 30 and the coil 37 are at rest and the rotation is stopped in any position, for a coiler drum which collapses concentrically. The magnetic coil stripper has been moved until the coil stripping electromagnet 53 contacts the end of the coil 37. The tying electromagnet 75 is then energized and pulled down until it touches the upper remote cylindrical surface 37″ of coil 37 and due to the magnetic pull it clamps the coil firmly together to prevent spiral expansion.

Figure 4:
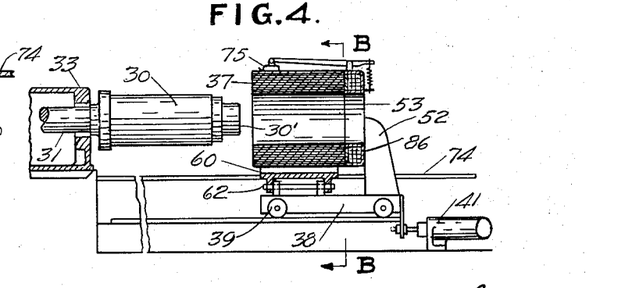
Fig. 4 is a view similar to Fig. 3 but showing the coil stripper and coil removed from the strip coiler.
Figure 5:
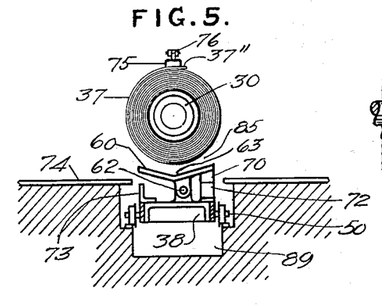
Fig. 5 corresponds to a transverse vertical cross section substantially on the line B—B of Fig. 4 showing the coil removed from the coiler.

The entire coil stripping electromagnet is now energized thereby holding the coil in its concentric position; after which the coiler drum is collapsed. Actuating fluid under control of valve 44 is now admitted to cylinder 41 moving the entire magnetic coil stripper, with the coil 37 suspended from the face of the coil stripping electromagnet 53, to the right until the drive end 37′ of the coil clears the overhung end 30′ of the coiler drum, all as shown in Fig. 4. The coil 37 when contacting the face of the energized coil stripping electromagnet 53 becomes for all practical purposes a solid mass, at the contacting end, due to the magnetic lines of force passing through the layers of steel or iron thus temporarily in effect welding them together. This condition prevents the coil from becoming extended telescopically and when the magnet coil stripper is being withdrawn it pulls the strip out of the gripper slot as well as the entire coil off of the coiler drum. It also prevents the outer layers of short coils from springing open spirally. On long coils the tying electromagnet 75 has the same temporary effect on the opposite end of the coil thus preventing spiral expansion of the coil from end to end and eliminating the necessity of tying the coil before it is stripped. This tying can now be performed with the coil stripped as shown in Fig. 4 and after the tying is completed the tying electro-magnet 75 is de-magnetized and returned to its extreme radial position by the counterbalance means.

If the coiler drum collapses eccentrically it is preferable to stop the drum and immediately collapse it with the gripper slot and entering end of the strip in the lower semi-circumference thus allowing the maximum space and clearance for stripping the entering end. With this exception the sequence of operation is as above.

Figure 6:
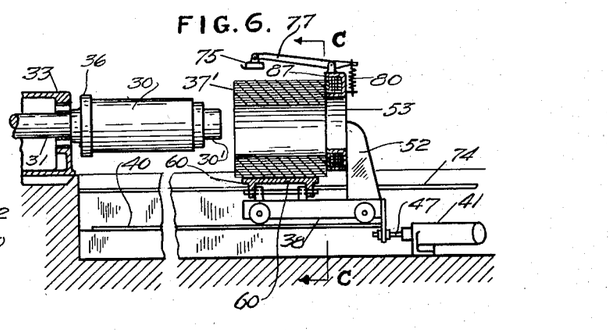
Fig. 6 is a longitudinal vertical elevation partly in section showing the coil stripped from the strip coiler and lowered upon the electromagnetic unloading cradle.
Figures 7, 8, 9, 10, 11:
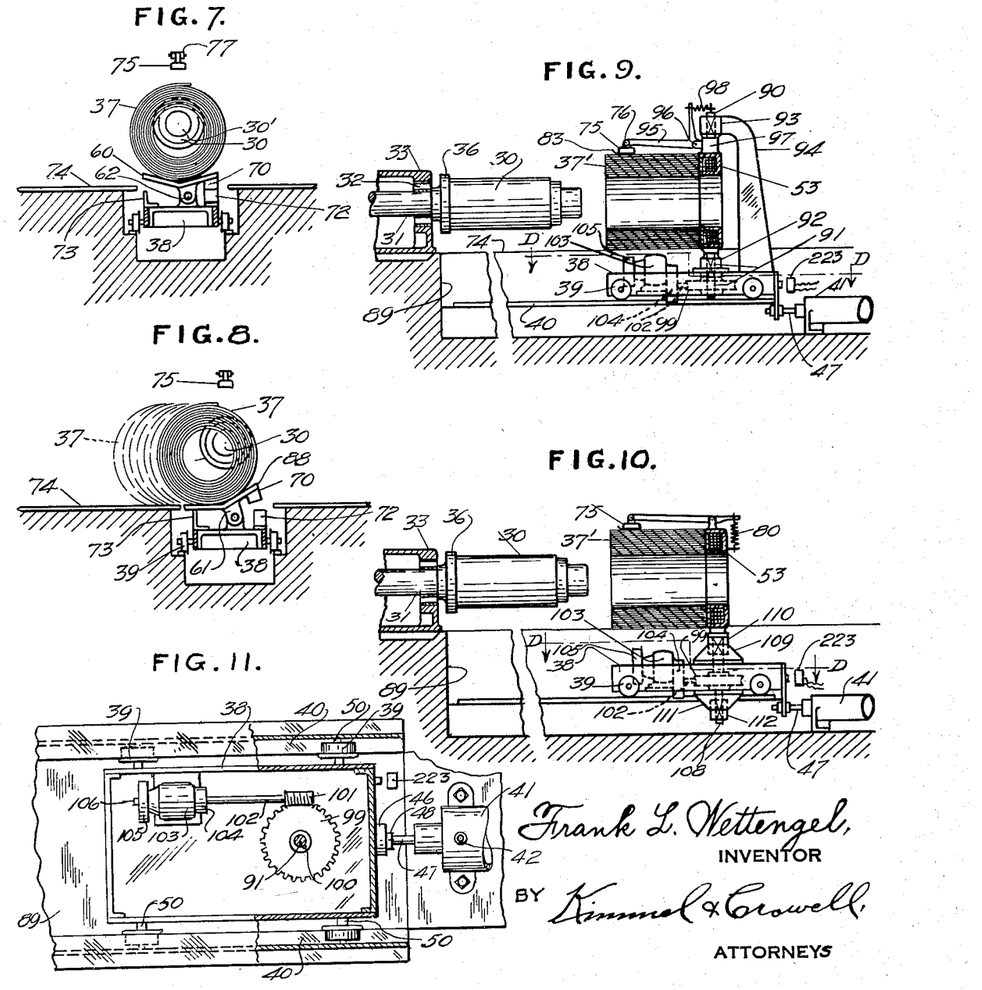
Fig. 7 is a transverse vertical cross section on the line C—C in Fig. 6.
Fig. 8 is a transverse vertical cross section showing the unloading cradle allowing a coil to roll off of the coil stripper.
Fig. 9 shows a magnetic coil stripper constructed in accordance with the present invention and trunnioned to deliver the coil with its axis rotated horizontally in any position up to approximately 120 degrees away from the axis of the coiler drum.
Fig. 10 is a view similar to Fig. 9 but trunnioned to deliver the coil with its axis rotated horizontally in any position on a complete circle.
Fig. 11 is a sectional plan view on line D—D of either Fig. 9 or 10.

The cradle electro-magnet 72 is now energized thereby holding the magnetic unloading cradle 60 firmly in the position best shown in Figs. 2—5 and 7. The space 85 between the cradle 60 and the outside diameter of the coil 37 is greater as the coil diameter decreases and may be as much as six or eight inches. In order to prevent the minimum diameter coils from dropping this distance the lower portion 86 (see Fig. 12) only of the coil stripping electro-magnet 53 is de-energized. The one or more sections of the top remain magnetized sufficiently to hold the coil in a horizontal position but with a reduced coefficient of friction. This allows the coil to slowly slide down along the face 87 (Fig. 6) of the coil stripping electro-magnet. The coil 37 is thereby gently lowered onto the cradle 60 as shown in Figs. 6 and 7.

The cradle electro-magnet 72 is now de-magnetized and the eccentric load due to the weight of the coil tips the cradle counterclockwise until it engages limit stop 73 and the coil is rolled off as shown in Fig. 8 onto the floor 74 or other means of transportation. As soon as the coil is off of the cradle the latter returns to its original position because the side 88 (Fig. 8) on which the cradle electro-magnet armature 70 is located is heavier than the opposite side. The stripper is now ready for the next coil. The manner of controlling these operations will be described hereinafter in connection with Fig. 12. The foregoing describes stripping, unloading, and delivering a coil with its axis parallel to the coiler drum axis.

For unloading and delivering a coil, with its axis rotated through a horizontal angle up to approximately 120 degrees from the coiler drum axis the coil stripper incorporating the features of this invention is arranged with the coil stripping electromagnet trunnioned in top and bottom bearings as shown in Fig. 9. To deliver the coil at any angle up to a complete circle the magnet 53 must have an extended bottom trunnion with bearings as shown in Figs. 10—19 and 21. In each of these arrangements there is embodied a car frame 38 and other equipment similar to that previously described except the cradle and cradle electromagnet as previously described are omitted from the car 38.

In Fig. 9 the coil stripping electromagnet 53 is rotatably mounted on top and bottom trunnions 90 and 91 respectively, carried in a bottom bearing 92 integral with car frame 38, and in a top bearing 93 carried by the top bearing support bracket 94 integral with the car frame and diagonally attached to allow the coil stripping electromagnet 53 a greater angle of rotation without interfering with support 94. The tying electromagnet 75 is pivotally supported at 76 upon a lever arm which is in the form of a bell crank 95. It is pivoted at 96 upon a bracket carried by the enlarged portion 97 of the upper trunnion. The upper arm of the bell crank is connected by the adjustable spring 98 to the extremity of the trunnion 90. In this manner the lever moves with the coil magnet.

To effect rotation of the coil stripping electromagnet about the axis of the trunnion, a power drive is arranged. A worm wheel 99 is keyed at 100 to the lower trunnion 91. This wheel is driven by the worm 101 carried upon the drive shaft 102. The drive shaft is driven by the motor 103 through a gear train of reducing gears, housed in the gear box 104. The motor is appropriately fastened upon the car 38. A magnetically operated spring brake 105 is connected to the outer end of the motor shaft 106 so that the spring normally holds the brake on. When the motor is operated an electromagnet 107 (Fig. 18) releases the brake and allows the motor to rotate. This control is more fully described in the descriptions hereinafter given.

In Figs. 10—19 and 21 the coil stripping electromagnet 53 is rotatably mounted on one trunnion 108 extended entirely on the bottom. Mounted on the top of the car frame 38 is a top bearing brackt 109 carrying top bearing 110. On the bottom is mounted bearing bracket 111 carrying bottom bearing 112. The diameter and length of the trunnion 108 and the distance between the bearings 110 and 112 is sufficient to give the necessary stability and rigidity to the coil stripping electromagnet 53. Attached to trunnion 108 in Fig. 10 is a worm wheel 99 which in turn is driven by worm 101 on drive shaft 102 driven from the geared motor 103 through gear box 104 as previously described. This gearing is more clearly shown in Fig. 11. Necessary stops and brakes are provided for controlling the rotation of the coil stripping electromagnet with the suspended coil to the desired position for unloading. The rotation can be accomplished by other means such as ordinary gearing, sprockets and chain, cylinders operating a rack and pinion attached to the trunnion or a combination of these means.

Figures 19, 20:
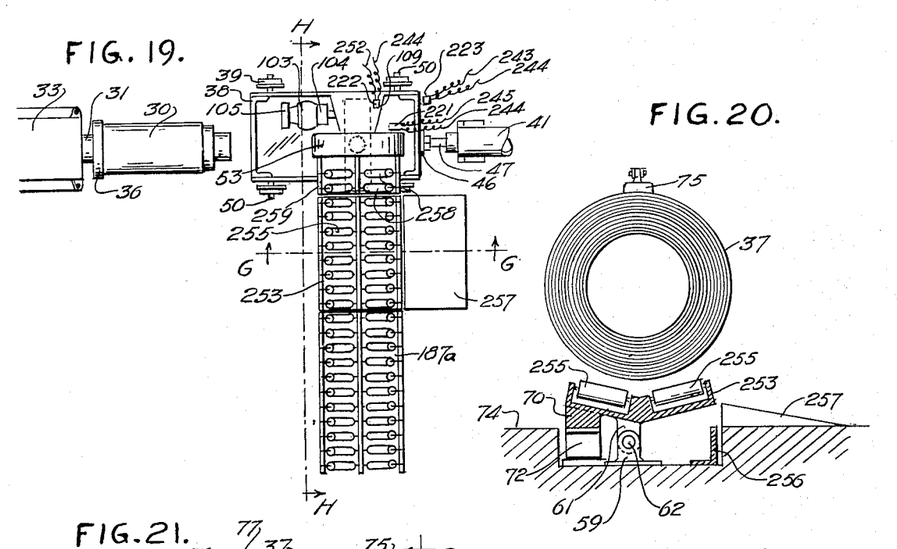
Fig. 19 is a plan view of Fig. 10 in which the coil is rotated for delivery after stripping. This plan shows a trough type roller conveyor for receiving the coil also a magnetic unloading roller conveyor cradle.
Fig. 20 is a larger scale transverse vertical cross section corresponding to a view on the line G—G of Figs. 19 and 21 showing the electromagnetic unloading roller conveyor cradle.

In the two arrangements shown in Figs. 9 and 10 the angle of rotation for unloading is predetermined as shown in Fig. 19, which is a plan view of Fig. 10 (for Fig. 9 a similar arrangement would be shown) and shows the stripper car 38 withdrawn to its extreme position with the coil stripping electromagnet 53 rotated 90 degrees counterclockwise from the axis of the coiler drum 30, the dotted lines showing the position of the magnet before rotation.

With the magnet in the rotated position as shown its axis is directly over and coincides with the center line of a trough type roller conveyor 187a which type is used for conveying coils longitudinally with their axes. After the coil is deposited on this conveyor it must be unloaded, for which purpose a magnetic unloading roller conveyor cradle 253 is provided and is mounted on the floor 254 of a pit in the conveyor flow line.

With the exception of the rollers 255 mounted on the cradle trough faces to allow longitudinal movement of the coil and making the cradle somewhat longer than the maximum coil length so the coil when being rolled off will clear the ends of the stationary conveyor, the magnetic unloading roller conveyor cradle 253 is essentially the same as cradle 60—previously described—being trough shaped and having the depending eccentric integral lugs 61 pivotally supporting the cradle by means of the pivot shaft 62 upon supporting bearings 59 fastened on the floor 254 of the pit.

The cradle has the usual magnet armature portion 70 formed on one side and adapted to be acted upon by the lines of magnetic force from the cradle electromagnet 72.

Figure 21:
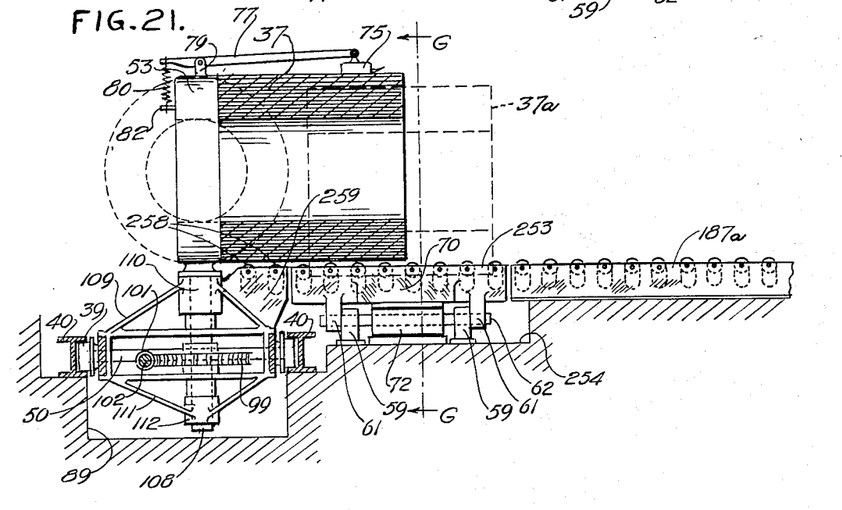
Fig. 21 is a larger scale side elevation partly in section on line H—H Fig. 19 with the rotating motor removed.

Figure 20 is a section through the magnetic unloading roller conveyor cradle at G—G Figures 19 and 21 looking at the end of the coil. The cradle is heavier on the side having armature 70 so that it will return to the position indicated in Fig. 20 when a coil is not present upon it. In unloading a limit stop 256 is arranged to determine the movement in the other direction. Fig. 21 is an elevation partly in section at H—H Fig. 19 with the motor 103 removed. These two figures are on a larger scale and more clearly show the previously mentioned parts.

This magnetic unloading roller conveyor cradle 253 can be located anywhere in the trough type conveyor flow line or if desired any number can be used; each placed at the various desired unloading locations. In Figs. 19 and 21 the magnetic unloading roller conveyor cradle is located close to the magnetic coil stripper but far enough away to permit rotation of the coil stripping electromagnet 53 to its stripping position when the coil 37a is still resting on the magnetic unloading conveyor cradle 253. To close the gap between the rotated coil stripping electromagnet 53 and the end of the cradle, rollers 258 are mounted on a support 259 attached to the car frame 38 and bearing bracket 109. These rollers are practically a continuation of the trough type roller conveyor and will facilitate the travel of coils onto the magnetic unloading roller conveyor cradle and will prevent short coils from canting and jamming against the stripping magnet face. In case the cradle is located some distance from the stripper the roller support 259 for rollers 258 will be omitted from the stripper car and the conveyor 187a frame extended as a cantilever to support the rollers 258. All rollers have anti-friction bearings and are strong enough to carry the load placed upon them. A skid 257 placed at the magnetic unloading roller conveyor cradle allows the coils to roll onto the floor.

The principle of operation of the magnetic unloading roller conveyor cradle for use in a trough type conveyor flow line used in connection with strippers where the coil is rotated from its stripping position before being unloaded from the stripping electromagnet will be exactly the same as the magnetic unloading cradle 60 previously described and shown in Figs. 1 to 8. In the arrangements shown in Figs. 9—10—19 and 21 the sequence of operation is the same as previously described up to Fig. 4, after the tying electromagnet 75 has been returned to its extreme radial position. The next operation is different and consists in starting the geared motor 103, and through the worm and worm wheel rotating the coil stripping electromagnet 53 with the suspended coil 37 until it coincides with the magnetic unloading roller conveyor cradle and trough type conveyor, as heretofore described, which latter is located at the desired unloading angle. The coil stripping electromagnet is now partially de-magnetized as described with reference to Figure 6 thereby unloading and depositing the coil partly on the first conveyor rollers and partly on the cradle 253. The coil is moved forward so it is entirely on the cradle as shown at 37a in which position the stripping electromagnet will clear it when rotated back to its stripping position which is the next operation. The stripper is now ready to strip the next coil and the stripped coil 37a can be unloaded off of the cradle 253 or it can proceed on the conveyor 187a to another cradle for unloading.

Figure 12:
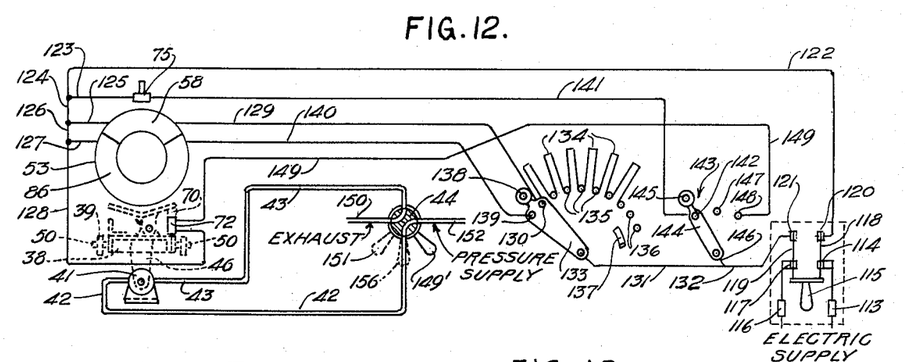
Fig. 12 is a schematic wiring and piping control diagram for the stripping, tying and unloading operations in Figs. 1 to 11 inclusive also 19—20 and 21.

Referring to Fig. 12 the wiring and piping control circuits intended for use with the magnetic coil strippers are shown. This system is especially arranged for the controls to be used for the devices shown in Figs. 1 to 11 inclusive, also Figs. 19, 20, and 21, the control for the rotating motor 103 having been omitted. The electrical supply is so indicated. One side of the line runs through the fuse 113 to the fixed terminal 114 of the cut-out switch 115, which latter is arranged to disconnect the entire equipment from the power supply. The opposite side of the line extends through fuse 116 to the fixed terminal 117. A single throw switch having the blades 118 and 119, carries the circuits from the first named terminals to the fixed terminals 120 and 121. All of the magnets are connected to one side of the line from a common conductor, 122. The tying magnet 75 is connected to it by the conductor 123. The upper third or top portion 58 of the coil stripping electromagnet 53 is connected by the conductors 124 and 125, while the lower portion 86 is connected by the conductors 124, 126 and 127. The unloading cradle magnet 72 is connected to it by the circuit 124, 126 and 128. As heretofore mentioned the coil stripping electromagnet 53 is constructed in sections so as to be capable of being energized to various degrees in order to prevent the minimum diameter coils from being dropped. This separation is indicated in Fig. 12 by the divided annulus 53. The upper third is indicated at 58 and the lower two thirds at 86. As heretofore described, it is preferable to energize the top 58 and bottom 86 of magnet coil 53 independently and variably. A return circuit 129 extends from the top coil 58 to a contact 130 which places the top of the magnet in direct connection to the other side of the line by the conductors 131 and 132, the movable blade 133 completing the circuit from 130 to 131.

In order to energize the magnet 58 to various degrees, a series of resistance elements 134 are arranged to be inserted in series with the magnet by moving the contact blade 133 over the series of contacts 135. As the blade moves from right to left it initially places all of the resistance in the circuit and then gradually cuts all of the resistance out of the circuit. When the blade moves from left to right it gradually cuts in more and more resistance until the blade finally reaches the contacts 136 where the circuit is broken and it is held by the stop 137. The contacts 136 are dead contacts and are not included in any of the circuits. The blade 133 being manually movable by means of a handle 138, remains against the stop 137 when the controller is not in use.

It will be noted that the switch 133 is wide enough to cover any two of the contacts 130, 135, 136 and 139 at one time. When the switch is in the extreme right hand position on dead contacts 136 both of the magnets 58 and 86 are disconnected and consequently inactive. As the switch is moved to the left a circuit is completed through the resistance 134 so that a small amount of current is supplied to the upper magnet 58 only. As the switch blade 133 continues to move to the left the various sections of resistance are cut out until contact 130 is reached, at which time all of the resistance is cut out and the magnet 58 is operated at full strength. Continued movement of the blade brings the blade into contact with the contact 139. This contact is one terminal of the lower portion of the magnet 86 and is connected to that lower portion 86 by means of a conductor 140. With the switch in the extreme left-hand position the magnet 53 is fully energized with both the upper and lower portions 58 and 86 energized from the contacts 130 and 139.

The reverse movement of the switch arm 133 first breaks the circuit through contact 139 and thereby de-energizes the lower portion 86 of the coil stripping electromagnet 53. Continued movement gradually inserts resistance in the circuit of the magnet 58 thus energizing it to various decreasing amounts and allowing the coil 37 to gradually slide down the face of the magnet as described more particularly in connection with the Figs. 6 and 7.

The tying electromagnet 75 and the unloading cradle electromagnet 72 are energized independently and at different times. The circuit for the tying electromagnet 75 returns by way of conductor 141 to a contact 142 of the switch 143. The latter has a movable contact arm 144 which is manually operable by means of the handle 145. The movable contact 144 is connected to the return wire 132 by means of the conductor 146. The circuit for the tying electromagnet is as follows: 120—122—123—75—141—142—144—146—132—121. With the switch 144 in the position indicated, the tying electromagnet is completely energized while the cradle electromagnet 72 is de-energized. Movement of the switch handle 145 to the right places the switch in engagement with the neutral terminal 147 and disconnects the tying electromagnet from the circuit. Continued movement of the switch to the right then engages the switch arm with the contact 148, the latter being connected to the cradle magnet 72 by means of the conductor 149. In this position the switch connects the cradle magnet to the power circuit and completely energizes the magnet. The circuit in this instance is as follows: 120—122—124—126—128—72—149—148—144—146 — 132 — 121. When the switch is in the vertical position the contact terminals 148 and 142 are de-energized and the tying magnet and cradle magnet are also de-energized.

It will now be understood that the cradle magnet and tying magnet are independently energized and that their circuits are so arranged that only one of these magnets can be energized at one time. The upper portion of the coil stripping magnet may be energized in degrees gradually increasing the strength thereof and finally energizing the lower portion of the magnet also.

It will be readily appreciated that the electrical control as described in connection with Fig. 12 provides a control circuit for the stripping magnet 53, the tying magnet 75, and the cradle magnet 72; or in case the coil is rotated, for the roller conveyor cradle magnet 72, all as shown in Figs. 1 to 11 inclusive, 19—20, and 21. The control for the rotating motor 103 will be described hereinafter in connection with Fig. 18.

For operating the traversing cylinder 41 the pressure supply is connected to a four-way valve 44 operated by handle 149'. The front end of the cylinder 41 is connected to the valve by pipe 42 and the rear end of the cylinder is connected to the valve by the pipe 43. With the valve in the position shown, the pressure is in the front end of the cylinder 41, the back end being open to the exhaust 150 and the stripper is withdrawn as shown in Figs. 1, 4, 6, 9 and 10. By moving the handle 149' to the left 90 degrees to the dotted position 151, the pressure from the supply pipe 152 is admitted to the back end and the front end is connected to the exhaust. This will traverse the stripper forwardly to contact the coil as shown in Fig. 3. With the handle in the vertical position 156 all ports of the four-way valve are closed and the stripper is stationary in the location it happened to be in when the valve ports were closed by placing the handle in the vertical position. Fig. 12 as drawn shows the magnet 53 with its parts 58 and 86, and the magnet 75, energized to full strength, and the magnet 72 idle.

The foregoing description refers particularly to coils and coiler drums each mounted with its axis horizontal. A magnetic coil stripper constructed in accordance with the present invention but arranged to strip a coil which has been coiled upon a drum having a vertical axis, is shown in Figs. 13, 14, 15 and 16. In this arrangement (see Fig. 13) the collapsible coiler drum 30 is mounted with its vertical shaft 31 mounted in upper and lower bearings 157 and 158 all with their axes vertical in drive frame 33 and rotatably driven by suitable bevel gear 159, driven by pinion 160 carried on shaft 161 and driven by geared motor 162. The latter has its gear train in gear box 163. The brake 36 as previously described is used. The coil stripping electromagnet 153 is similar to coil stripping electromagnet 53 previously described. The magnet 153 will be energized as a unit instead of in sections and is keyed at 166 on plunger 154 and mounted in a floating position on the upper end of and secured to the plunger 154 so that the magnet axis coincides with the axis of the coiler drum 30 and if desired it can be counterbalanced by a weight 155.

Figures 13, 14, 15, 16:
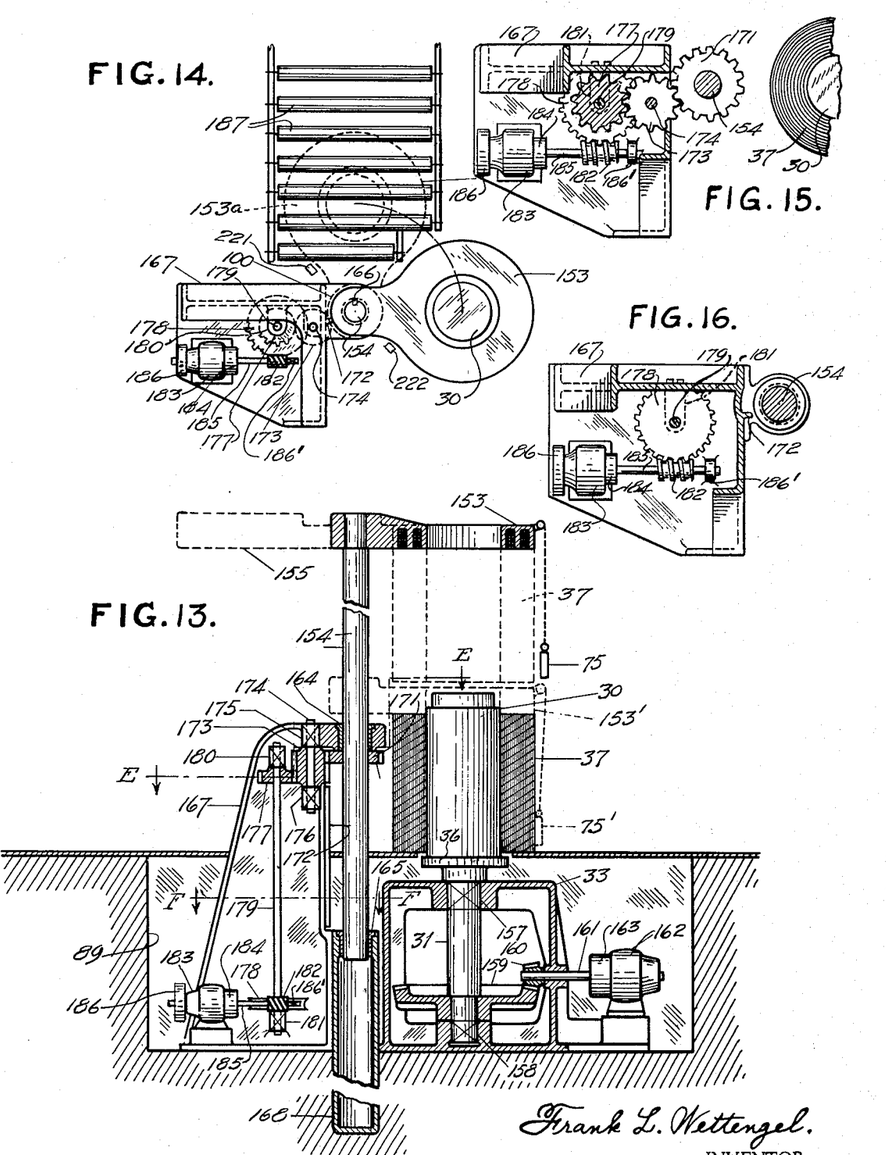
Fig. 13 is a vertical elevation partly in section illustrating a magnetic coil stripper constructed in accordance with the present invention but mounted to strip a coil which has been coiled on a drum having a vertical axis.
Fig. 14 is a top plan view of the equipment illustrated in Fig. 13.
Fig. 15 is a section plan on the line E—E of Fig. 13.
Fig. 16 is a section plan view on the line F—F of Fig. 13.

The plunger 154 is rotatably and slidingly mounted in a top bearing 164 and bottom stuffing box bearing 165 with its axis vertical and parallel with the axis of the coiler drum 30 and shaft 31. Bearing 164 is secured to a part of the stripper housing 167 on which is also attached the fluid cylinder 168 carrying the stuffing box bearing 165, the cylinder and bearing thus becoming an integral part of housing 167.

Cylinder 168 is used for elevating the coil stripping electromagnet 153 by way of the plunger 154 and a fluid medium controllably introduced into a cylinder by the valve 169 having control handle 170. A spur gear 171 is keyed on plunger 154 in such a position that when the axis of the coil stripping electromagnet 153 coincides with the axis of the coiler drum 30 one of the tooth spaces of the gear 171 will mesh with a corresponding spline guide 172 integral with the stripper housing 167 thereby locking the plunger against rotation and guiding the magnet on an axis concentric with that of the coiler drum.

At the top end of this spline guide 172 is a spur gear 173 which is the same pitch as, and meshes with gear 171. Gear 173 is rotatably mounted and so arranged that the lower end of its teeth will just clear the top end of the spline guide 172. When the gear 173 is at rest in proper rotary position one of its teeth will coincide with and form a continuation of the spline guide 172.

Gear 173 is mounted on shaft 174, carried in upper and lower bearings 175 and 176, integral with the stripper housing 167, and is driven by inter-meshing gear 177 which with worm wheel 178 is mounted on a common shaft 179 carried in upper and lower bearings 180 and 181 also integral with the stripper housing. Meshing with worm wheel 178 is worm 182 connected to the geared motor 183 mounted on and integral with the stripper housing. The gear train of the motor is preferably in a gear housing 184 and is arranged to drive its shaft 185 carrying the worm 182. The left-hand end of motor 183 is provided with a brake 186 to hold the motor when stopped and to quickly stop the rotation. The end of shaft 185 will be supported in a bearing 186. This gear train and motor are provided with suitable stops and limit switches so rotation will be limited and so it will always be arrested with one of the teeth of gear 173 coinciding with spline guide 172. These limit switches may be adjustably positioned and arranged to be actuated by one of the appropriate shafts or other parts.

A tying electromagnet 75 is provided as previously described to prevent spiral expansion.

The roller conveyor 187 or other means transports the coil for other processing.

The sequence of vertical stripping is as follows: The plunger 154 is normally extended with its integral parts into the elevated position and the axes of both the coiler drum 30 and coil stripping electromagnet 153 are concentric as in Figs. 13 and 14. In this position the gear train is at rest and locked with one of the tooth spaces of gear 171 meshing with a tooth in gear 173 which in turn coincides with spline guide 172 thus arresting rotation and guiding the vertical movement of plunger 154 and all integral parts. The forming of the coil 37 on the coiler drum 30 has just been completed and the coil is ready to be removed or stripped. Actuating pressure in cylinder 168 is now exhausted allowing the plunger 154 with all integral parts to descend until the coil stripping electromagnet 153 arrives at the lower position 153' (as shown in Fig. 13 by dotted lines) contacting the top of the coil 37. The tying electromagnet 75 is near the bottom of the coil and is now energized and assumes position 75' shown in dotted lines, the magnetism gripping the coil and preventing spiral expansion.

The electromagnet in position 153' is next energized thereby gripping and firmly and rigidly holding the coil 37. After the coiler drum 30 has been collapsed, actuating pressure is admitted to cylinder 168 raising the plunger 154 to the end of its stroke which is limited when gear 171 contacts bearing 164. The plunger carries with it the coil stripping electromagnet and tying magnets, thus stripping the coil from the coiler drum 30.

With the magnet 153 in its extreme top position (see Fig. 13) the lower end of the longest coil can clear the top end of the coiler drum 30 and the coiling of the next coil can immediately be started. With the coil in this top position the geared motor 183 is started. The motor by the gear trains, see Figs. 15 and 16, operating worm 182, worm wheel 178, shaft 179, gears 177, 173, and 171, rotates the plunger 154 with all its component parts and the coil 37 attached to the coil stripping electromagnet 153, to a predetermined position 153a. (See dotted lines in Fig. 14.) At such point the coil axis coincides with the center of a roller conveyor 187 or other transportation means. In this position a tooth of gear 173 and a tooth space of gear 171 will coincide with spline guide 172. Cylinder 168 is now exhausted lowering the plunger 154 and all integral parts with the coil 37 until it rests on the roller conveyor 187. The coil is now tied, the tying electromagnet 75 is next de-magnetized, then the coil stripping electromagnet 153 releases the coil and allows it to proceed on the conveyor.

The plunger 154 with all its parts but without the coil 37, is then elevated to its extreme position. In this position it is then rotated by the geared motor and gear train in the opposite direction, from that previously described, until the axis of the coil stripping electromagnet 153 again coincides with the axis of the coiler drum 30. In this position it can remain until the next coil is completed or it can be lowered close to the top of the coil where it is ready to strip the coil when the latter is completed.

Figure 17:
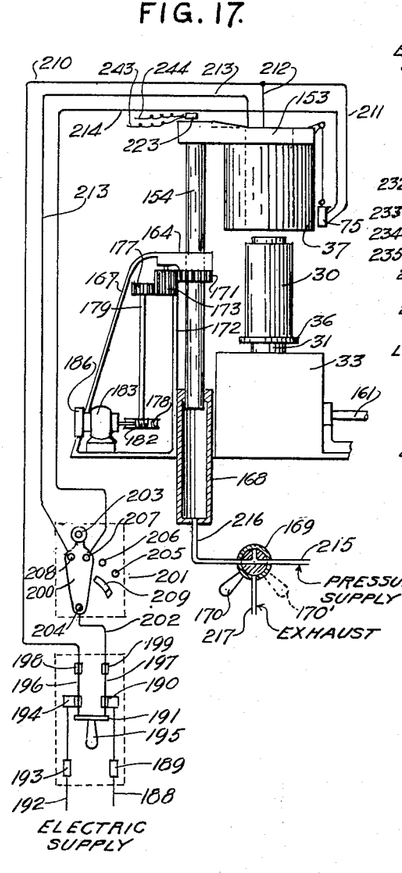
Fig. 17 is a schematic wiring and piping control diagram for the stripping and tying operations in Figs. 13 to 16 inclusive.

In Fig. 17 the wiring and piping arrangements for control of the vertical stripper are shown and it will be noted that this arrangement is slightly different from that used in connection with the control of the horizontal type of stripper. In this case the coil stripping electromagnet 153 can be completely energized and de-energized in one step because the coil can be lowered onto the conveyor 187 by the plunger 154 without any danger of dropping the coil. In this figure the electrical power supply is indicated as in Figure 12, one side of the line extending from the conductor 188 through the fuse 189 to one fixed terminal 190 of the main cut-out switch 191. The opposite side of the line comes from the power source by way of conductor 192, the fuse 193 and another fixed terminal 194 of the cut-out switch 191. The cut-out switch is operated by handle 195 which moves the two switch blades 196 and 197 at the same time, the blades being pivotally connected to the fixed terminals of the switch 198 and 199.

The electrical supply from the terminal 199 extends to the movable blade 200 of the control switch 201 by a conductor 202. The switch arm is manually operated by a control handle 203 and is pivoted about the point 204. The blade is arranged to move over a series of contacts 205, 206, 207, and 208. The switch when moved to the extreme right hand position is limited in movement by means of the stop 209 which holds the switch blade 200 upon the dead contacts 205, 206. The switch blade is broad enough to cover two contacts at the same time.

The terminal 198 is connected by means of a common conductor 210 with the coil tying electromagnet 75 and the coil stripping electromagnet 153 by the conductors 211 and 212 respectively. The return circuit from the stripping electromagnet 153 is by means of a conductor 213 which connects the magnet to the terminal 208 of the switch 201. The return conductor completing the circuit for the tying electromagnet 75 is the conductor 214 which terminates in the contact 207. If it is desired these two magnets may be operated from a single circuit.

In moving the switch from the right hand idle position in a counterclockwise direction about its pivot, the switch blade 200 first engages the contact 207 and thereby energizes the tying electromagnet 75 by way of the following circuit: 199—202—204—200—207—214—75—211—210—198. Continued movement of the switch to the left thereby causes it to engage the contact 208 with the resulting energization of the coil stripping electromagnet 153 by way of the circuit: 199—202—204—200—208—213—153—212—210—198. With the switch in the extreme right hand position the two magnets are de-energized and with the switch in the extreme left hand position the two magnets are energized. At the intermediate point the coil stripping magnet is de-energized while the tying electromagnet is energized.

For operating the plunger 154 by the cylinder 168, the pressure supply is controlled by means of the three-way valve 169 having an operating handle 170. With the valve in the position shown in full lines, the pressure supply from the pipe 215 is connected to the cylinder 168 by means of the pipe 216. In this position the pressure raises the plunger and the coil stripping magnet into its extreme upper position as shown in either Figure 13 or 17. By turning the handle 170 of the valve to the right 90 degrees, the valve handle assumes the dotted position 170' and brings the valve ports into a position such that the pipe 216 from the cylinder is connected to the exhaust pipe 217. Gravity will then cause the parts of the coil stripping magnet to slowly fall into the lowermost position indicated by dotted lines in Fig. 13. With the valve handle 170 in an intermediate vertical position between the two heretofore described extreme positions, all of the ports are closed and the plunger is held stationary in the position at which it was located at the time the valve was moved into the neutral position.

Figure 18:
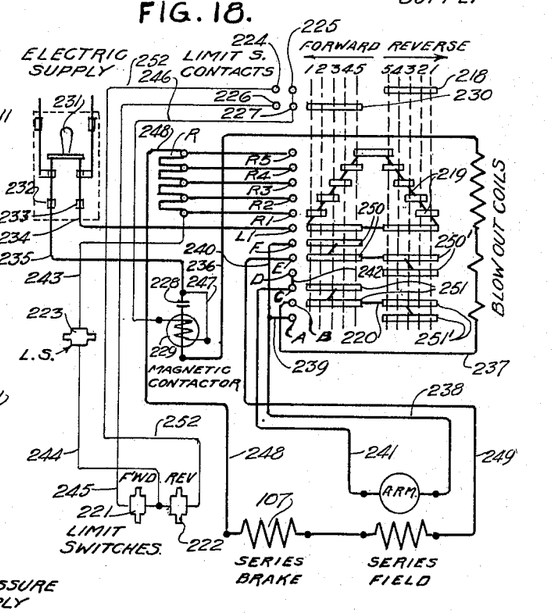
Fig. 18 is a schematic wiring diagram of the controller for operating the rotating motors shown in Figs. 9—10—11—13—14—15—16—17 and 19.

Fig. 18 is the wiring diagram for a manually operated controller for operating the reversible motors 103 shown in Figs. 9—10—11 and 19, and also the motors 183 in Figs. 13 to 17 inclusive, in which cases the motor rotates the coil after stripping. The controller for controlling these motors is preferably of the well-known drum type having forward and reverse control from a neutral position. Under the words "Forward" and "Reverse" are the series of numbers 1 to 5 inclusive with corresponding vertical dash lines, which represent the number of resistance steps in the controller. The wide and narrow rectangles 218, 250, 251, etc. through which these vertical lines pass, represent the various movable contact segments for cutting out the resistance or connecting the armature, brake or limit switches, etc. in the circuits. The heavy diagonal lines 219 and horizontal lines 220 are conductors which join the contact segments making practically one conductor out of each group of contact segments. These segments are actually mounted on a cylindrical drum but for ease of explanation are indicated in the diagram as if the cylindrical surface were unrolled and laid on a flat surface. The contact fingers A to F inclusive, L1, and R1 to R5 represent fixed contact fingers which can be connected to each other by means of the segments on the drum controller. The heavy lines R at the left of the numbers R1, to R5, inclusive, will be the starting resistance in the circuit. The series brake 107 and the series field are so marked with the armature of the motor represented by the word "Arm". The limit switch, forward 221 and reverse 222 are normally closed switches and the limit switch 223 is normally opened. The four fixed limit switch contact fingers 224, 225, 226 and 227 are positioned in the top of the drum controller. The magnetically operated contactor 228 is a switch which is normally opened but which is closed by an electromagnet 229 when the latter is energized by current passing through it.

The requirements of these rotating motors which are controlled by the above described controller are as follows:

First, the motor must be locked when idle to prevent rotation. This is accomplished by series brakes 105 and 186 which are operated by springs for braking and released by an electromagnet, 107. Second, it must be impossible to start the motor until the horizontal stripper 53 has been entirely withdrawn, or the vertical stripper plunger 154 has been extended to its extreme position. This is to prevent starting of the motor which would rotate the stripper magnet with the coil attached when partly off of the drum 30. To fulfill this second motor requirement, the limit switch 223 which is normally open is placed in such a position that the car body 38 (see especially Figs. 9—10—11 and 19) will contact it to close its circuit at the end of the movement of the car 38 away from the coiler drum. Similarly, in the arrangement shown in Figs. 13 and 17 the gear 171 or the top end of the plunger 154 will operate a contact and close the limit switch 223 when the plunger 154 is at the end of its upward stroke. If the equipment is not withdrawn or elevated in extreme position the limit switch 223 would be open, and the circuit to the magnetic contactor would be open. There would be no magnetism to close the magnetic contactor and the main circuit would remain open. The motor and control equipment would not operate thereby fulfilling the second requirement. Third, the motor must always stop at the same predetermined position so that the coil will coincide with the magnetic unloading roller conveyor cradle 253 and conveyor 187a (Fig. 19) or conveyor 187 (Fig. 14) onto which it is to be unloaded. To fulfill this requirement, the limit switch 221 which is normally closed, is so positioned that its circuit is opened thus de-magnetizing the magnet 229 of the magnetic contactor 228 breaking the main circuit and stopping the motor when the coil stripping electromagnet 53 (Fig. 19) has been rotated by its trunnion and has arrived at its unloading position or electromagnet 153 has been rotated about the axis of the plunger 154 and has arrived at its appropriate unloading position. This latter would be indicated, for example, in Fig. 14 by the dotted line position of the magnet 153a. The fourth requirement is that the motor must rotate forward to deliver the coil to its unloading position and must reverse to bring the coil stripping electromagnet 53 or 153 back to its initial position. This requirement is fulfilled by the controller connections. The fifth requirement is that the motor must stop when the axes of both the coil stripping electromagnet 53 or 153 and coiler drum 30 coincide. This requirement is attained by placing the limit switch 222, which is normally closed, so that its circuit is opened when the axes of the drum and stripping magnet coincide and the operation is the same as limit switch 221.

The motor for accomplishing these purpose is preferably a series wound motor having a series brake in the circuit. Fig. 18 is a wiring diagram which will meet all of the foregoing requirements The operation of this controller will now be described. The power supply goes through the main switch 231 to its terminals 232 and 233. A conductor 234 from the latter goes to contact finger L1 of the drum controller. The other line terminal goes by conductor 235 to the contacts 228 of the magnetic contactor, then by line 236 to the blow out coils and by conductor 237 to terminal B. The motor armature is connected to terminals A and F by conductors 238, 239 and 240, and to terminals C and D by conductor 241 and jumper 242. The equipment of either the horizontal or vertical stripper is assumed to be in the extreme position and limit switch 223 with its circuit closed. The drum controller is advanced "Forward" connecting L1, to R1, B to C and E to F, also the two lower limit switch contacts 226 and 227 by segment 230 at the top of the drum.

This causes current to flow through limit switch 223 and "forward" limit switch 221 to the two lower limit switch contacts 226 and 227 which are now connected to the magnet 229 of contactor 228 and to the main line 233. This circuit is from the line terminal 233, to line 234, contact L1, segment 219, contact R1, conductor 243, limit switch 223, conductor 244, forward limit switch 221, line 245, contacts 226, 230, and 227, line 246, magnet coil 229, conductor 247, to line 235 to terminal 232. The magnetic contactor is immediately closed by its electromagnet to complete the main circuit. This main circuit follows: terminal 233—234—L1—segments 219—R1—R—248—brake 107—field-conductor 249—E—segments 250—F—240—238—arm—241—C—segments 251—B—237—blow out coils—236—228—235—232.

Continued advancing of segments cuts out resistance R1 to R5 when the top segment contacts R5 with the other connections remaining the same. This will cause the main current to flow as follows: L1 to R5, through the series brake releasing its hold, through series field, to E, to F, to arm, to C to B through blow out coils, magnetic contactor, and to the main supply line. This rotates the motor in the forward direction until the circuit in the forward limit switch 221 is broken by the stripping electromagnet reaching its unloading position which cuts off the current to the magnetic contactor opening the main line and setting the brake.

To bring the equipment back the reverse segments of the drum are advanced connecting L1 with R1, A to B, D to E, and the two top limit switch contacts 224 and 225 by segment 218. Current now flows from R1 through 223 and reverse limit switch 222 to the upper two limit switch contacts 224 and 225, to the magnet 229 of contactor 228 and the circuit is completed. This control circuit is as follows: 233—234—L1—219—R1—243—223—244—222—252—224—218—225—227—246—229—247—235—232. This operates the magnetic contactor 229 for reverse rotation closing the motor circuit through contacts 228. This circuit is as follows: 233—234—L1—219—R1—R—248—107—field—249—E—250′—D—242—C—241—arm—238—239—A—251′—B—237—blow out coils—236—228—235—232. Continued advance of the reverse connectors cuts out all resistance R with the current flowing as follows: L1 to R5, to series brake, to field, to E, to D, to C, to arm, to A, to B, blow out coils, to magnetic contactor and main line 232.

This changes the direction of the current in the armature and reverses the motor until the reverse limit switch 222 opens its circuit which cuts off the current to the magnetic contactor opening the main line and setting the brake as before.

It will now be appreciated that the magnetic coil stripper herein described is useful and has many advantages among which are: The coil is pulled off of the coiler drum instead of being pushed off; the advantage being that the leading or entering end cannot buckle in the gripper slot, and the inner layers of the coil will not become extended telescopically, when the entire end of the coil is gripped or held by the coil stripping electromagnet. With a bifurcated yoke as now in use, only the lower half of the coil is pushed. As soon as the coil is stripped clear of the end of the coiler drum the coiling of the next strip can proceed as it is not necessary to wait until the previous coil is unloaded and the stripper returned to its original position. The coil can be tied while the next strip is being coiled. The space formerly occupied by a bifurcated yoke can now be occupied by strip thus allowing a shorter length coiler drum for a given width of strip, which makes the coiler drum more rigid due to less overhang. The stripper can deliver the coil with its axis in a horizontal plane at any desired angle to the coiler drum axis. A coil can be stripped from a coiler having its drum and shaft mounted vertically. With the prior art type strippers this was impossible.

There are no moving parts required for gripping, attaching or holding the coil to the stripping mechanism and therefore nothing to get out of order. The entire mechanism is of the simplest design containing the minimum number of proven practical parts none of which can be damaged or which can damage other equipment or the coil even if improperly operated by an inexperienced operator. It is evident the upkeep and operating cost will be small. Practically no skill is required to operate the device. On the present types of coil strippers most of which employ coil lifting cylinders which are traversed by the car, the method of supplying the liquid or air pressure to the cylinder is by means of telescopic pipe connections, swivel or flexible pipe joint connections, or by a flexible hose all of which must operate under high pressure and are a constant source of trouble and upkeep cost. With the magnetic coil stripper all energy for operating the tying electromagnet; for unloading the coil onto the cradle; for holding or releasing the cradle to roll the coil off, is electrical and is supplied by an electrical conductor thus eliminating leaking liquid and hissing air.

It is obvious that the foregoing advantages are of great importance because the efficiency of all of the processing equipment preceding the coiler drum is increased, due to the fact that with the magnetic coil stripper it is not necessary to suspend operations while binding, unloading or returning the stripper to initial position for stripping the following coil.

Certain preferred features of the invention have been herein illustrated and described, it will be understood, however, that changes in the construction and operation of the parts may be made without departing either from the true spirit or scope of the invention. These variations are to be determined from the appended claims.

What I claim is:

1. In combination, a collapsible strip metal coiler, and a coil stripper having electro-magnetic means for adhering to a coil of magnetic strip metal at an end of the coil for bodily removing the latter from the coiler without distortion.

2. The combination with a collapsible strip coiler drum of a coil stripper relatively movable with respect thereto and including means for gripping by magnetic attraction a coil carried on said coiler drum for bodily removing said coil from the drum longitudinally with respect to the axis of the drum.

3. The combination with a collapsible substantially cylindrical strip coiler of a magnetic coil stripper including magnetic means arranged in substantially annular form and adapted to circumscribe the cylindrical strip coiler when the latter is in either collapsed or expanded position.

4. The combination with a collapsible substantially cylindrical strip coiler of a magnetic coil stripper including magnetic means arranged in substantially annular form and adapted to circumscribe the cylindrical strip coiler in either collapsed or expanded position, said magnet means comprising one or more electromagnets.

5. In combination, a collapsible strip metal coiling drum, a coil stripper including magnetic means of substantially annular form adapted for gripping a coil coiled on the drum, the axes of said means and drum being in alignment, means for moving the stripper relatively to the drum and coil to provide for said magnetic means, establishing gripping relation with respect to the coil for removing the latter from the drum, and means arranged to controllably de-energize said magnetic means for gradually releasing the gripped coil therefrom after the coil has been removed from the drum.

6. The combination of a collapsible strip metal coiling drum, an annular magnetic stripper for gripping, by magnetic attraction the coil on and for stripping it bodily from the drum, said stripper including portions capable of being selectively energized and de-energized, said drum having its axis horizontally aligned with the axis of the stripper, and said stripper including a controllable electric circuit for selectively energizing and de-energizing said portions to release the gripped coil.

7. The combination of a collapsible metal strip coiling drum, a vertically disposed, shiftable magnetic coil stripper, said drum having the axis thereof substantially horizontally aligned with the axis of said stripper, said stripper including magnetic means of annular form provided with a co-planar surface adapted to grip by magnetic attraction, one end of a coil wound on the drum for bodily removing it from the drum by shifting the stripper in one direction of its movement, and controllable electrical circuit means for alternately intermittently energizing and de-energizing said magnetic means to provide for the gripped stripped coil to gradually slide down off of said surface.

8. A magnetic coil stripper comprising a mobile support, one or more coil stripping electromagnets mounted on the support and arranged with the magnetic faces thereof in the same vertical plane, the said support having a hollow central portion of larger radius than and adapted to be disposed in concentric encircling relation and at right angles to an expanded coiler drum, said support being so formed and adapted to be so arranged relatively to the coiler drum that the said magnetic means can be advanced longitudinally over the coiler drum to contact the ends of coils formed from different width metal strips.

9. The combination with a collapsible strip coiler, having the axis of its drum horizontal; of a magnetic coil stripper having a stripping electromagnet of annular form and having its axis disposed coaxially with the axis of the drum and including a plurality of sections with the top sections thereof energizable with or independently of the other sections.

10. In combination a collapsible strip coiler, a magnetic coil stripper having a coil stripping electromagnet which can contact one end of a coil, and a tying electromagnet arranged when energized to contact the cylindrical surface of the coil at the opposite end whereby to prevent spiral expansion and uncoiling of the coil.

11. In combination a collapsible strip metal coiling drum, a coil stripper having a stripping magnet arranged for relative co-axial movement with respect to and along the axis of said drum, a tying magnet arranged for radial movement and longitudinal movement with respect to said drum, and means arranged to simultaneously move said magnets with respect to said drum.

12. In combination a collapsible strip metal coiling drum, a floatingly suspended pendant like electromagnet arranged for radial and longitudinal movement with respect to said drum, said magnet disposed for contacting the outer cylindrical surface of a coil and when energized, arranged to clamp the convolutions and prevent spiral expansion and uncoiling of the coil.

13. In combination a collapsible strip metal coiling drum, a coil stripper having a stripping magnet arranged for relative co-axial movement with respect to said drum, a tying magnet arranged for relative radial movement and longitudinal movement with respect to said drum, and means arranged to simultaneously move said magnets with respect to said drum, said last named means including a carriage for said magnets and power operated means for moving the carriage.

14. In a coil handling device for removing and transporting a coil from a coil-former, said device comprising a mobile combined coil stripping, suspending, releasing, receiving and dumping structure therefor comprising the combination of a car adapted to be shifted to a position under the coil on the coil-former and from such position, a combined gravity operated electrically controlled coil receiving and dumping cradle secured to and disposed over a portion of the top of the car, said cradle being trough-shaped and eccentrically pivoted underneath, longitudinally with relation to the trough apex and overbalanced on the pivot side of said apex to cause pivotal rotation of the cradle opposite to normal rotation due to the eccentric location of said pivot, a stop on the overbalanced side of the cradle for restricting said rotation and disposed to normally maintain the cradle in a horizontal position, a stop on the car disposed on the opposite side of the pivot to restrict pivotal rotation of the cradle opposite to that caused by the overbalance, a coil stripper for the coil carried by said car at the rear end of the cradle including a support provided with magnetic means respectively adapted to grip one end of the coil when the car is positioned under the coil-former and to bodily remove the coil from off said coil-former when the car is shifted from under the coil-former whereby the coil will be suspended over the cradle, electric means carried by the car and co-acting with the stop on the overbalanced side of the cradle for controlling the pivoting movement of the cradle in a direction for dumping the coil, and means for controlling the magnetic means to provide for the lowering of the coil from its suspended position into the cradle for dumping.

15. In a coil handling device for removing and transporting a coil from a coil former, said device comprising a mobile combined coil stripping, tying, suspending, releasing, receiving and dumping structure formed of a car adapted to be shifted to a position under the coil on the coil former and from such position, a gravity operated electrically controlled coil receiving and dumping cradle disposed over a portion of the top of the car, means for pivotally connecting the cradle, eccentrically of the latter to the top of the car, a stripper for the coil consisting of an upstanding support secured to said car rearwardly of the cradle carrying magnetic means suspended over the car and respectively adapted to grip one end of the coil, when the car is positioned under the coil-former and to bodily strip the coil from off said coil-former when the car is shifted from under the coil-former, whereby the coil will be suspended over the cradle, a magnetic coil tying means for the coil suspended over the cradle from said stripper and adapted to engage the coil to prevent the uncoiling thereof when the coil is bodily carried by the magnetic means, means for controlling the stripper and tying means to provide for the lowering of the coil from its suspended position into the cradle for dumping, and said cradle and car having coacting magnetically controlled means for controlling the dumping movement of the cradle when the coil is deposited thereon.

16. In a coil handling device of that type including a coil forming mandrel; the combination of a carriage arranged for relative movements with respect to the mandrel; power operated means for effecting said relative movement, a coil stripping electro-magnet secured to and bodily moving with said carriage and arranged to grip the end of a formed coil by magnetic attraction for bodily stripping the coil from off the mandrel; a tying electro-magnet arranged to clamp the coil convolutions secured to, extended forwardly from and bodily moving with the stripping magnet; and an electro-magnetically controlled coil receiving, holding and dumping cradle secured to and bodily moving with the carriage, said cradle being arranged on the carriage below the coil tying magnet and forwardly of the stripping magnet.

17. In combination, a collapsible strip metal coiling drum, a magnetic coil stripper arranged for relative movement with respect to said coiler drum and having magnetic stripping means for bodily removing the coil from the drum, a tying magnetic means bodily carried by said stripper and arranged for relative movement with respect to the periphery of the coil when the latter is on said drum, power means arranged to simultaneously controllably move said stripper and its magnetic means relatively with respect to said drum; and control means for cooperatively and independently controlling said stripper and said tying means.

18. The combination with a collapsible strip metal coiling drum, of a magnetic coil stripper including a carriage having a stripping magnet of annular form carried thereby on vertical trunnions and rotatable in bearings mounted on said carriage so that the magnet may be concentrically positioned with respect to said drum, a tying magnet supported thereon, said stripper arranged for relative movement with respect to said drum, and means arranged to move said stripper with respect to said drum.

19. In combination a collapsible strip metal coiling drum, a magnetic coil stripper including a carriage and having a stripping magnet of annular form co-axial with said drum and carried on one or two vertical trunnions; bearings mounted on said carriage and rotatably supporting said trunnions, a tying magnet supported on said stripping magnet, and power operated means arranged to jointly rotate said magnets until the stripping magnet axis extends in a predetermined angular direction with respect to the axis of said drum.

20. In a coil handling device adapted for use in conjunction with a coil formed on a sheet metal strip coiler, the combination of a car having vertical bearings mounted thereon, a coil stripper connected with and bodily movable with the car and including an annular coil stripping magnet arranged to grip an end of the coil on the coiler by magnetic attraction when moved in one direction of travel of the car and in the other direction of travel of the car to bodily strip the coil from off the coiler, said stripper being formed with vertical trunnions rotatably mounted in said vertical bearings and arranged to rotate the magnet with the stripped off coil thereon to a position for discharge of the coil located at a point where the axis of the magnet is at a determinable angle with respect to the axis of the coiler, a tying magnet bodily carried by said stripper and arranged to clamp in abutting relation, by magnetic attraction, the convolutions of the coil, power operated means for effecting relative movement of the car relative to the coiler, and power actuated means arranged to effect a joint rotation in either direction of the tying and stripping magnets and to dispose the stripped coil at said angle when it is in gripping relation with the magnets.

21. In combination a strip coiler having a collapsible strip metal coiling drum working on a vertical axis, a magnetic coil stripper including a tying electromagnet and a stripping electromagnet, the latter being of substantially annular form and adapted to circumscribe the expanded coiler drum, said stripping electromagnet being mounted on a plunger disposed for vertical movement in a guiding bearing with the coil contacting face of the magnet positioned in a horizontal plane, and a cylinder for the plunger and in which said plunger is moved by fluid pressure.

22. In combination a strip coiler having a collapsible strip metal coiling drum, a magnetic coil stripper comprising a stripping magnet of annular form mounted, for relative vertical co-axial movement with respect to said drum, on a plunger disposed for limited vertical and limited rotary movement, in a fluid pressure operating cylinder, said cylinder and a guiding bearing both mounted on a supporting housing, a gear attached to the plunger, a spline guide attached to said housing with a tooth space of said gear slidingly meshing therewith, the axis of said guide being parallel with the plunger and drum axes to produce the aforesaid co-axial movement, said gear when contacting the guiding bearing arranged to limit vertical movement, a power driven gear disposed with a tooth forming a continuation of said spline guide arranged to rotate the plunger and stripping magnet is a predetermined direction, and electrical means to limit said rotation.

23. A magnetic coil stripper comprising a housing carrying a cylinder and plunger arranged for relative vertical and rotary movement with respect to a substantially vertical coil forming mandrel, power operated means mounted on the housing to effect said rotary movement, control means to effect said relative vertical movement, a coil stripping magnet of substantially annular form mounted on the plunger and a tying magnet suspended therefrom, control means to control the tying magnet and the stripping magnet for stripping the coil from the mandrel and unloading the coil after rotation, electric control means including limit switches cooperating with said plunger and the rotated stripping magnet for controlling said power operated means.

24. In combination a collapsible strip metal coiling drum, a coil stripper arranged for relative movement with respect to said coiler drum and having magnetic stripping means, a tying magnet means arranged for movement with respect to said drum; power means arranged to controllably move said stripper and its magnetic means with respect to said drum; and control means for cooperatively and also independently controlling the drum, the stripper, the magnetic means, and the power means.

25. In combination a collapsible strip metal coiling drum, a coil stripper having a magnet arranged for relative movement with respect to said drum, a tying magnet arranged for relative movement with respect to said drum, and means arranged to move said magnets with respect to said drum and to release a coil from the magnets with the axis of the coil extending in a predetermined direction with respect to the axis of said drum.

26. In a coil handling device for a coil formed on a collapsible metal strip coiling drum, the combination of a gravity operated, eccentrically pivoted, coil receiving, holding and dumping cradle, a cradle holding magnet and a cradle limit stop, both arranged to limit opposite pivotal movements of the cradle, said cradle, when unloaded normally held from movement by said magnet and tending to move towards said stop when unbalanced on the reception of the coil, a coil stripping magnet arranged relatively to the cradle for gripping the coil on the drum, bodily stripping the coil from the drum and suspending the coil over the cradle, means common to the cradle and stripping magnet for bodily moving them in unison towards and from the drum to provide for the stripping magnet gripping, stripping and suspending the coil, and controlling means common to the cradle magnet and stripping magnet to provide for the suspended coil to gradually slide down relatively to the stripping magnet onto the cradle and to de-energize the cradle magnet to provide for the automatic dumping of the coil from the cradle.

27. A coil stripper comprising a carriage arranged for relative movement with respect to a coil forming mandrel, power operated means for effecting said relative movement, a coil stripping electromagnet carried on said carriage and arranged to grip a formed coil by magnetic attraction, power operated means arranged to unload a coil from the stripper, and electrical control means including limit switches cooperating with said carriage for controlling the operation of said power operated means.

28. In a coiling handling device of that type including a coil receiver, the combination of a collapsible metal strip coiler, and a mobile coil stripping electromagnet of annular form arranged on one direction of its movement to grip one end of the coil by magnetic attraction and on another direction of its movement to bodily strip the coil from off the coiler for suspending it over the receiver, said coiler and magnet having their axes co-axial.

29. In a coiling handling device of that type including a coil receiver, the combination of a collapsible metal strip coiler and a mobile coil stripping electro-magnet of annular form arranged on one direction of its movement to grip one end of the coil by magnetic attraction and on another direction of its movement to bodily strip the coil from off the coiler for suspending it over the receiver, said coiler and magnet having their axes co-axial, and controlling means for said magnet to provide for the gradually lowering of the suspended coil into the receiver.

FRANK L. WETTENGEL.